United States Patent [19]

Chikazawa et al.

[11] Patent Number: 5,416,764
[45] Date of Patent: May 16, 1995

[54] NOISE COMPONENT REDUCTION IN THE DATA SIGNAL AND OPTICAL SCANNING DEVICE

[75] Inventors: Yoshiharu Chikazawa, Tokyo; Akira Kawamura, Hachiouji, both of Japan

[73] Assignee: Deutsche Thomson-Brandt GmbH, Villingen-Schwenningen, Germany

[21] Appl. No.: 105,784

[22] Filed: Aug. 12, 1993

[30] Foreign Application Priority Data

Aug. 13, 1992 [DE] Germany .................. 42 26 777.3

[51] Int. Cl.⁶ .................. G11B 7/13; G11B 7/135; G11B 20/24
[52] U.S. Cl. .................. 369/107; 369/13; 369/44.41; 369/124
[58] Field of Search .................. 369/13, 107, 44.32, 369/124, 44.41

[56] References Cited

U.S. PATENT DOCUMENTS

| | | | |
|---|---|---|---|
| 4,541,082 | 9/1985 | Horikoshi et al. | 369/44.34 |
| 4,661,944 | 4/1987 | Van Sluys | 369/44.32 |
| 4,743,774 | 5/1988 | Maeda et al. | 369/44.11 |
| 4,959,821 | 9/1990 | Morimoto et al. | 369/107 |
| 5,105,399 | 4/1992 | Shimonou | 369/13 |
| 5,222,055 | 6/1993 | Fujita | 369/44.32 |
| 5,258,969 | 11/1993 | Refregier et al. | 369/107 |
| 5,297,114 | 3/1994 | Itoh et al. | 369/44.32 |
| 5,361,245 | 11/1994 | Yoshida et al. | 369/44.28 |

FOREIGN PATENT DOCUMENTS

| | | | |
|---|---|---|---|
| 0292160 | 11/1988 | European Pat. Off. | G11B 7/12 |
| 3604723C2 | 2/1986 | Germany | G11B 7/13 |
| 3732874A1 | 9/1987 | Germany | G11B 7/135 |
| 3821811C2 | 6/1988 | Germany | G11B 7/13 |

OTHER PUBLICATIONS

Neues aus der Technik, Number 3 vom 15, Sep. 1989 Servogeregelter Riemenantrieb mit adaptiver Resonanzunterdrückung.

Neues aus der Technik, Number 3, vom 15 Sep. 1987 Verringern von Laserrauschen in optischen Aufzeichnungs–und/oder Wiedergabeanordnungen.

Applied Optics, vol. 25, No. 22, 15 Nov. 1986 Erasable digital audio disk system K Torazawa, et al. of Sanyo Electric Co. Ltd., Japan.

IEEE Transactions On Magnetics, vol. MAG-23, No. 5, Sep. 1987 Crosstalk and Overwrite Noise Characteristics In Magneto-Optical Recording, M. Yamamoto et al., NTT Electrical Comm. Labs. Japan.

*Primary Examiner*—Georgia Y. Epps
*Assistant Examiner*—Kim-Kwok Chu
*Attorney, Agent, or Firm*—Joseph S. Tripoli

[57] ABSTRACT

A system for reducing noise in a data recording/playback device includes an optical system for scanning a recording medium and providing first and second polarization signals. The polarization signals are added to provide an added signal. The added signal is differentiated to provide a noise reduction signal. The polarization signals are substracted to provide a difference signal. The differentiated signal is substracted from the difference signal to provide a data signal having a substantially reduced noise level.

5 Claims, 2 Drawing Sheets

NOISE COMPONENT REDUCTION IN THE DATA SIGNAL AND OPTICAL SCANNING DEVICE

BACKGROUND OF THE INVENTION

The invention relates to a method and a device for the reduction of the noise components in the data signal for an optical scanning device for the reading and/or writing of a magneto optic record carrier wherein a light source radiates light onto the record carrier and the light reflected from the record carrier is guided in dependence on its direction of polarisation onto a first photo detector or onto a second photo detector. Devices are envisaged, especially in connection with record carriers on which items of data are stored by means of pits and in magnetic domains, which make it possible to simultaneously read the items of data and to separate them from each other with the least possible mutual interference despite the superimposition on the record carrier. However, noise components already occur even with magneto optical discs in which the items of data are stored exclusively in magnetic domains since the magneto optical discs have different optical properties, for example different birefringence, so that the polarisation beam splitter which can only be optimally adjusted for one type of a magneto optic disc leads to interference components as a result of deviations from its optimal location.

For the reading of an optical or magneto optic record carrier, it is already known to extract the data signal representing the items of data stored in the magnetic domains of the record carrier from the difference of the photo electric voltages of the first and second photo detectors and to extract the data signal representing the items of data stored in the pits of the record carrier from the sum of the photo electric voltages of the first and second photo detectors c.f. DE-OS 37 32 874 A1. To this end, optical scanning devices are used which include a summing amplifier and a differential amplifier whereby the data signal representing the items of data stored in the pits of the record carrier at the output of the summing amplifier is supplied either via an amplitude and phase compensating network and a modulator to the laser driver or, in another embodiment, to a divider for the separation of the data signals. In a record carrier having both magnetic domains as well as pits, the intensity of the reflected light would constantly fluctuate and be superimposed as interference on the data signal. For the avoidance of this superimposition, the reflected light is, in a first embodiment, kept constant by means of a modulator. A data signal which represents the items of data stored in the magnetic domains is then derivable at the output of the differential amplifier. The items of data contained in the pits are comprised in the control signal of the modulator. Since the light output of the light source is modulated by the data signal coming from the pits, one also refers to this method as a laser feedback process. Therein however, the adjustment of the laser feedback amplification is particularly difficult since the laser feedback amplification has to be readjusted to the most suitable value for each record carrier or each pit of the record carrier. The laser feedback system has to be implemented as a wide band amplifier and thus tends to oscillate easily. The outlay necessary for the separation of the items of data stored in the magnetic domains and the pits of the record carrier is reduced in a second embodiment of an optical scanning device which utilises a divider for the separation of the data signals. The light source is not modulated with the data signal from the pits so that the modulator as well as the amplitude and phase compensating network are not required. In essence, the difference signal between the photo diodes is the data signal stored in the magnetic domains but which however, has superimposed thereon the items of data stored in the pits in the form of an amplitude modulation. Due to the use of a divider, it is so, that basically, the data signal stored in the pits is separated from the data signal stored in the magnetic domains but noise components occurring in particular in connection with the edges of the pits remain in the data signal of the magnetic domains.

Since, in contrast to the data signal stored in the pits, the data signal stored in the magnetic domains is alterable by a new recording, the data signal stored in the magnetic domains is also referred to as a RAM signal and the data signal stored in the pits is referred to as a ROM signal. The outlay is of course reduced due to the electronic separation of the ROM and RAM signals but, at the same time, the noise components coming for example from the pits are increased in the data signal of the magnetic domains.

For the reduction of the noise components in the data signal, it is known to regulate the intensity of the light reflected from the record carrier or transmitted through the record carrier at a constant value independently of the optical properties of the record carrier c.f. EP PS 310 812 B1. The reduction of the noise components is achieved exclusively by way of the laser feedback which demands a heavy outlay.

Therefore, it is the object of the invention to reduce noise components in the data signal without laser feedback and also at low cost.

SUMMARY OF THE INVENTION

In accordance with the invention, this object is achieved in that, the light reflected from the record carrier is converted by at least one photo detector into an electrical signal which is differentiated by a differentiating circuit and is used after the differentiation for the reduction of the noise components in the data signal. For the provision of the electrical signal, there can be used either, a photo detector with which the light reflected from the record carrier is detected or, the two photo detectors, which are utilised for the detection of the polarisation components of the light reflected from the record carrier and whose output signals are combined by addition in a summing amplifier can be used. The use of the electrical signal for the reduction of the noise components ensues in that the differentiated electrical signal is combined in a differential amplifier with the signal from the magnetic domains detected by the first and second photo detector as well as a differential amplifier.

For carrying out the method, optical scanning devices are provided which include a differentiating circuit or a differential amplifier and a differencing amplifier. An electrical signal equivalent to the light reflected from the optical record carrier, which is provided either by a photo detector or by summing of the two photo detectors detecting the polarised light, is supplied to the differentiating circuit. For the reduction of the noise components in the data signal made available from the magnetic domains, the electrical signal is applied to a known differential amplifier to which the differentiated signal is supplied so that a data signal, which corresponds to the items of data stored in the magnetic domains and which is reduced as regards noise components, is available at the output of the differential amplifier. This data signal having reduced noise components is then supplied in known manner to a divider to which the ROM signal is applied.

Due to the differentiation of the electrical signal, which is equivalent to the light reflected from the optical record carrier, noise components coming in particular from the pits of the record carrier are reduced without requiring for this purpose a laser feedback or a regulation of the reflected light at a constant value. Since the separation of the ROM and RAM signals, and in addition, the reduction of the noise components are realised in an electrical way and without laser feedback, the method and the device for carrying out the method require only a small outlay.

BRIEF DESCRIPTION OF THE DRAWINGS

The invention will be explained more fully hereinafter with the help of two embodiments in the drawings. Therein

DETAILED DESCRIPTION

Figure 1:
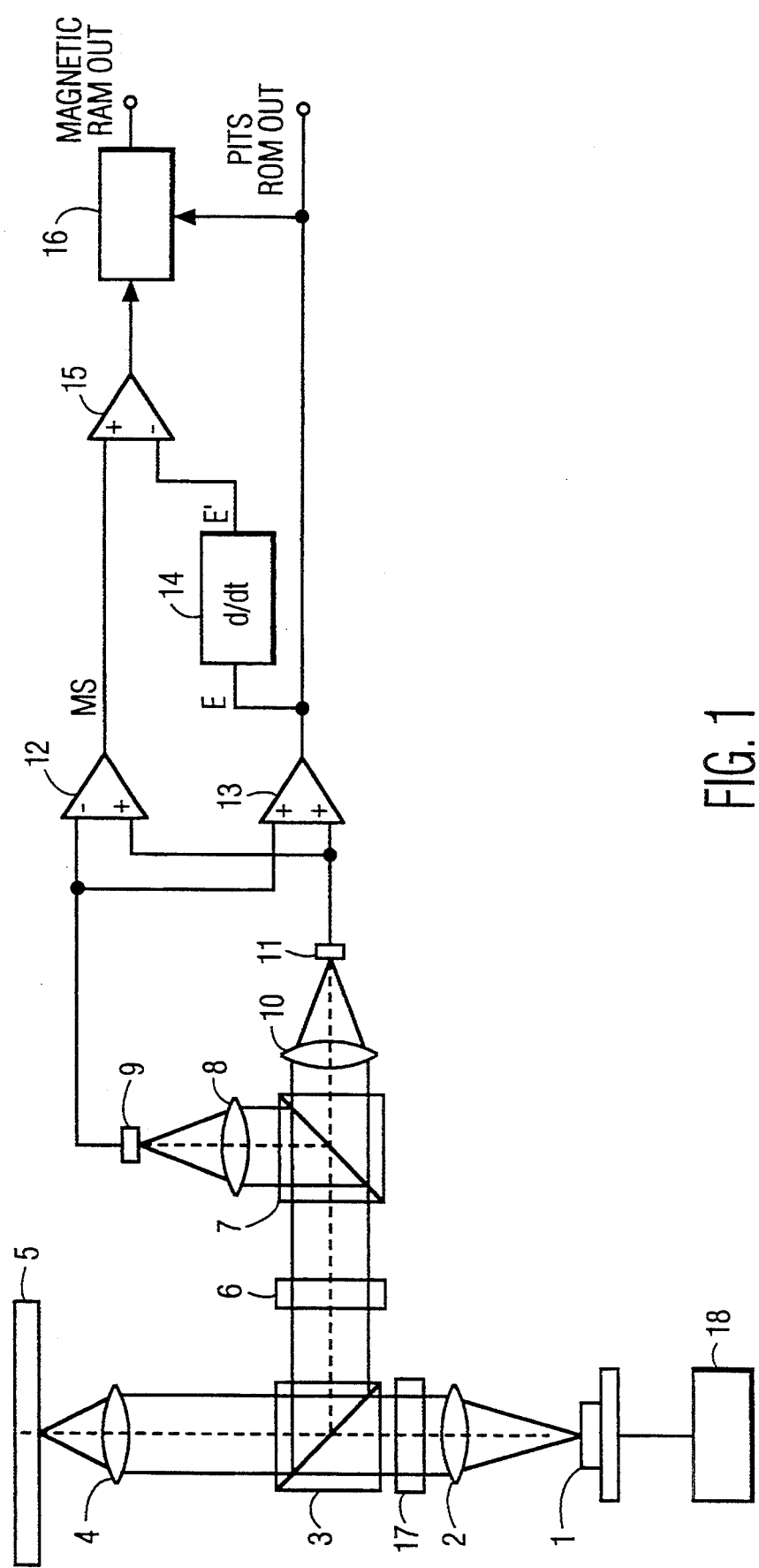
FIG. 1 shows a basic circuit diagram of an optical scanning device having direct noise component reduction, FIG. 2 a basic circuit diagram of an optical scanning device having indirect noise component reduction.

For the reduction of the noise components in the data signal detected from a record carrier in which items of data are stored both in pits as well as in magnetic domains, an electrical signal E corresponding to the light reflected from the optical record carrier 5 is used. The signal is supplied to a differentiating circuit 14 whose output is connected to a differential amplifier to which the data signal MS that corresponds to the items of data stored in the magnetic domains and which is detected by two photo detectors and a differential amplifier is supplied. A data signal having reduced noise components whose amplitude modulation is then separated out in a divider is then available at the output of the differential amplifier 15. For carrying out this method, an arrangement in accordance with FIG. 1 which includes a light source 1 in the form of a laser whose light is focused on the record carrier 5 by means of a first lens 2 and a first prismatic beam splitter 3 as well as by means of a second lens 4 is used. The light is reflected from the record carrier 5 which contains items of data stored both in pits as well as in magnetic domains and reaches a polarisation beam splitter 7 via the second lens 4 as well as the first prismatic beam splitter 3 and a λ/2 plate 6. The reflected light is directed according to the directions of polarisation by the polarisation beam splitter 7 via a third lens 8 to a first photo detector 9 or via a fourth lens 10 to a second photo detector 11. The outputs of the photo detectors 9 and 11 are connected both to a first differential amplifier 12 as well as to a summing amplifier 13. While the data signal ROM-OUT corresponding to the items of data stored in the pits of the record carrier 5 is directly available at the output of the summing amplifier 13, the data signal MS, which is available at the output of the differential amplifier 12 and which represents in essence the items of data stored in the magnetic domains of the record carrier 5, has an amplitude modulation caused by the pits of the record carrier 5 as well as noise components coming in particular from the edges, of the pits. A differentiating circuit 14 which is preferably formed by a differentiating amplifier is connected to the summing amplifier 13 especially for the reduction of the noise components in the data signal MS. The electrical signal E corresponding to the light reflected from the optical record carrier 5 at the output of the summing amplifier 13 is differentiated by the differentiating circuit 14 and supplied to a differential amplifier 15 that is connected to the differentiating circuit 14 and whose other input is connected to the output of the first differential amplifier 12. A data signal MS that already has reduced noise components but which still has an amplitude modulation modulated by the data signal ROM is available at the output of the second differential amplifier 15. For the provision of the data signal RAM-OUT corresponding to the items of data stored on the record carrier 5 in the magnetic domains, there is therefore connected to the output of the second differential amplifier 15 a divider 16 to which the data signal ROM-OUT is simultaneously supplied and which effects a separation of the amplitude modulation from the data signal MS so that a data signal RAM-OUT corresponding to the items of data which are stored in the magnetic domains of the record carrier 5 is available at the output of the divider 16. Thus, the optical scanning device corresponding to FIG. 1 does not have any feedback via a laser driver 18 to the light source 1 so that data signals ROM-OUT and RAM-OUT which are reduced as regards noise components are made available in an advantageous manner without laser feedback. Furthermore, a λ/2 plate 17 is provided in FIG. 1 but this is only required if the light source 1 is not already a light source 1 providing a polarised light. In the illustration corresponding to FIG. 1, information regarding the devices required for focusing and track following was deliberately dispensed with in order to particularly emphasise that a separation of the data signals RAM-OUT and ROM-OUT with a simultaneous reduction of the noise components is made possible without exercising any influence on the light source 1. The expression, direct noise component reduction, was chosen in respect of FIG. 1 since the devices required for the detection of the items of data stored in the magnetic domains can also be used in an advantageous manner for the reduction of the noise components.

Figure 2:
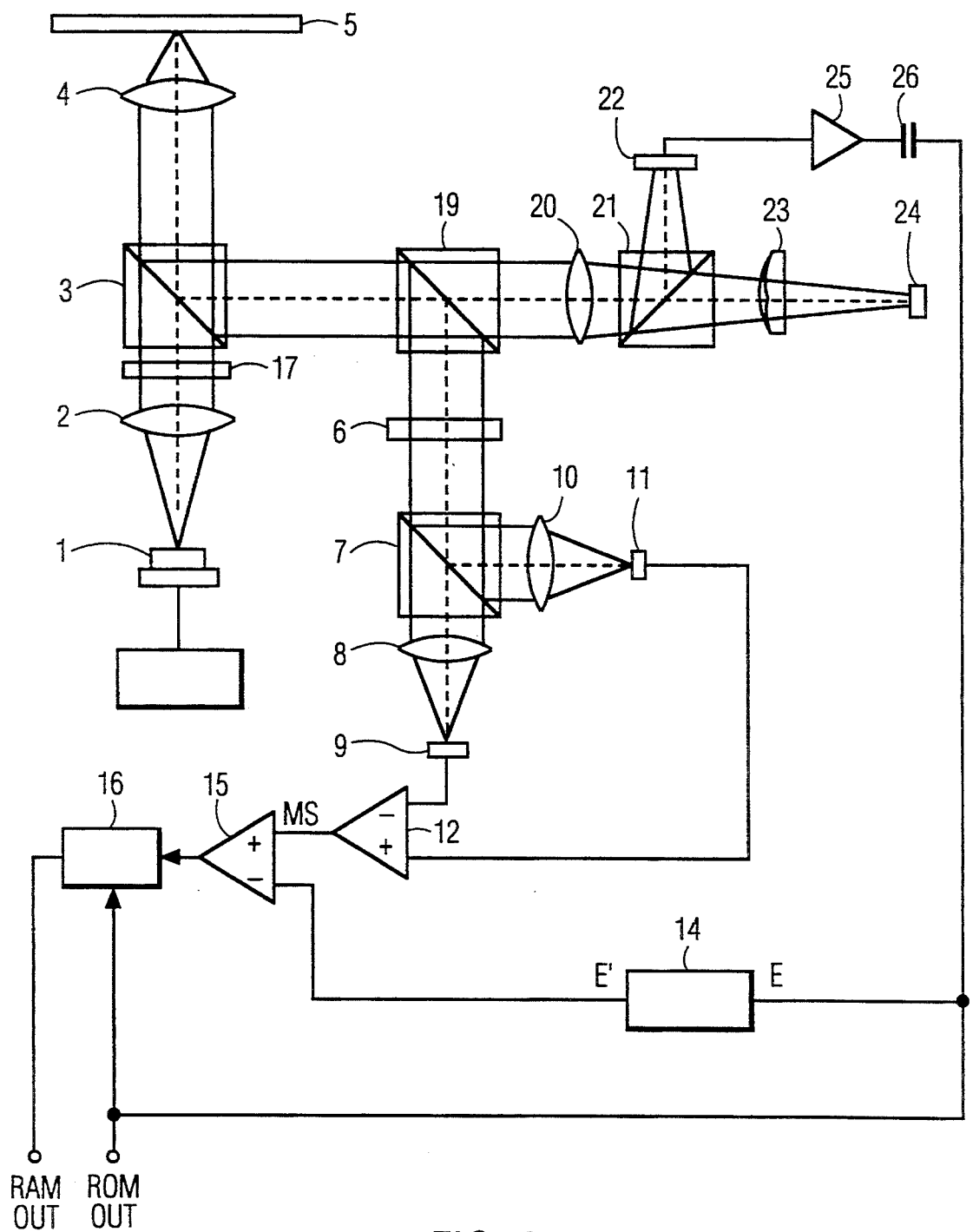

An optical scanning device for the indirect reduction of noise components in the data signal is illustrated in FIG. 2. Therein, the same references were used for objects corresponding to FIG. 1. The optical scanning device in accordance with FIG. 2 has additionally a second prismatic beam splitter 19, a third prismatic beam splitter 21, a fifth lens 20, a sixth lens 23 as well as a third photo detector 22 and a fourth photo detector 24. Furthermore, an amplifier 25 and a capacitor 26 for direct current isolation and amplification are provided. The data signal coming from the items of data stored in the pits is detected by the third photo detector 22 to which light reflected from the record carrier 5 is supplied via the first prismatic beam splitter 3, the second prismatic beam splitter 19, the fifth lens 20 and the third prismatic beam splitter 21. The data signal or RAM signal coming from the items of data stored in the magnetic domains is detected, in analogy with FIG. 1, by the first and second photo detector 9, 11 and supplied to the first differential amplifier 12. The data signal coming from the pits of the record carrier 5, which is detected by the third photo detector 22 reaches a differentiating circuit 14 and the divider 16 via the amplifier 25 and the capacitor 26 which are connected to the third photo detector 22. The differentiated ROM signal E' is then supplied, in analogy with FIG. 1, to a second differential amplifier 15 to which the data signal MS formed by the first amplifier 12 is simultaneously applied. The divider 16, with which a separation of the amplitude modulated component in the RAM signal is effected, is connected once more to the second differential amplifier 15. The data signal RAM-OUT which is reduced in noise components is then available at the output of the divider 16. The output signal of the first differential amplifier 12, which is a subtracting amplifier, contains the polarisation interference or the polarisation noise of the pit edges. This noise, which is very similar to the differential signal of the ROM signal, is then separated from the difference signal between the first and second photo detector 9, 11 by the differentiating circuit 14 and the differential amplifier 15.

With this type of noise signal reduction which is referred to as indirect noise signal reduction of the data signal, the electrical signal E' used for the reduction of noise signals is not detected directly by the first and second photo detector 9, 11 but rather a third photo detector 22 is used which is usable simultaneously however for the detection of the tracking error signal. The sixth lens 23 and the fourth photo detector 24 arranged after the third prismatic beam splitter 21 in FIG. 2 serve in particular for the control of the focusing of the light beam on the record carrier 5. With this type of reduction of the noise components in the data signal and separation of the data signals which come from the items of data stored in the pits and the items of data stored in the magnetic domains, feedback or influencing of the light source 1 is also not required. The ways of implementation described merely differ as regards the manner of producing the data signal ROM-OUT which, in the embodiment corresponding to FIG. 1, is formed in the electrical signal path and, in the embodiment corresponding to FIG. 2, is formed in the optical region.

We claim:

1. A method of reducing undesired signal components arising from edges of recorded pits in an optical information scanning device for a recording medium, said method comprising the steps of:

radiating light onto said recording medium;

directing light reflected from said recording medium and exhibiting a first polarization direction onto a first photo detector to provide a first signal;

directing light reflected from said recording medium and exhibiting a second polarization direction onto a second photo detector to provide a second signal;

adding said first and second signals to provide a summed signal, and differentiating said summed signal to provide a signal representing said undesired signal components.

2. The method of claim 1 further including the steps of subtracting said first and second signals to provide a difference signal representing magneto-optically recorded information susceptible of inclusion of said undesired signal components;

subtracting said signal representing said undesired signal components from said difference signal representing magneto-optically recorded information susceptible of inclusion of said undesired signal components to provide a data signal substantially free of said undesired signal components.

3. A system for reducing undesirable signal components arising from pit edges from recovered signal representing magneto-optically recorded information in a data recording/play-back device comprising:

an optical system for scanning a recording medium and providing first and second polarization signals developed from a light beam reflected from said recording medium and exhibiting first and second polarization directions respectively;

first means for adding said first and second polarization signals and providing an added signal representing information recorded in pits on said recording medium;

a differentiating circuit for differentiating said added signal and providing a signal representing said undesirable signal components;

second means for subtracting said first and second polarization signals and providing a difference signal representing information recorded in a magneto-optic layer of said recording medium, said difference signal susceptible of inclusion of said undesirable signal components; and third means for subtracting said differentiated signal from said difference signal and providing a data signal with said undesirable signal components substantially eliminated.

4. The system of claim 3 further including fourth means responsive to said data signal and said added signal for providing a data Signal with a portion of said added signal removed therefrom.

5. The system of claim 4 wherein said fourth means is a divider.

* * * * *